United States Patent
Haro et al.

(10) Patent No.: US 9,301,095 B2
(45) Date of Patent: Mar. 29, 2016

(54) APPARATUS AND METHOD FOR DETERMINING AND PROVIDING RELATIVE VALUES OF CONTACTS ASSOCIATED WITH MOBILE DEVICES WITHIN A LOCATION-BASED GROUP

(71) Applicant: Life360, Inc., San Francisco, CA (US)

(72) Inventors: Alexander Haro, San Francisco, CA (US); Christopher Hulls, Point Reyes, CA (US); Michael Borsuk, San Francisco, CA (US); Michael Hood, San Francisco, CA (US)

(73) Assignee: LIFE360, INC., San Francisco, CA (US)

( * ) Notice: Subject to any disclaimer, the term of this patent is extended or adjusted under 35 U.S.C. 154(b) by 0 days.

(21) Appl. No.: 14/301,230

(22) Filed: Jun. 10, 2014

(65) Prior Publication Data
US 2015/0358774 A1   Dec. 10, 2015

(51) Int. Cl.
*H04W 4/02* (2009.01)
(52) U.S. Cl.
CPC .............. *H04W 4/021* (2013.01); *H04W 4/028* (2013.01)
(58) Field of Classification Search
CPC ............................ H04W 4/021; H04W 4/028
USPC ....................................................... 455/457
See application file for complete search history.

(56) References Cited

U.S. PATENT DOCUMENTS

| | | | |
|---|---|---|---|
| 8,340,098 B2 | 12/2012 | Wirick | |
| 8,428,098 B2 | 4/2013 | Chen et al. | |
| 8,433,324 B2 | 4/2013 | Tang | |
| 8,436,773 B2 | 5/2013 | Seibert | |
| 8,436,901 B2 | 5/2013 | Uhm | |
| 8,437,972 B2 | 5/2013 | Ploplys | |
| 8,438,156 B2 | 5/2013 | Redstone et al. | |
| 8,600,408 B2 | 12/2013 | Brown | |
| 8,611,935 B2 | 12/2013 | Duarte | |
| 8,639,757 B1 * | 1/2014 | Zang et al. | 709/204 |
| 2003/0020623 A1 * | 1/2003 | Cao et al. | 340/686.6 |
| 2008/0070593 A1 * | 3/2008 | Altman et al. | 455/457 |
| 2008/0268869 A1 | 10/2008 | Lamba | |
| 2009/0009398 A1 | 1/2009 | Taylor et al. | |
| 2010/0205242 A1 | 8/2010 | Marchioro, II et al. | |
| 2010/0234044 A1 | 9/2010 | Lohbihler | |
| 2011/0066398 A1 | 3/2011 | Troxler et al. | |

(Continued)

*Primary Examiner* — Michael Neff
(74) *Attorney, Agent, or Firm* — Blakely Sokoloff Taylor & Zafman LLP

(57) ABSTRACT

A method of increasing accuracy of location determination of mobile devices within a location-based subgroup starts with server receiving location data and proximity information from each of the mobile devices. Location data received from first mobile device includes first mobile device's fixed location. Proximity information received from first mobile device includes an identification of mobile devices within a proximity sensitivity radius of first mobile device's location. Server forms subgroup of mobile devices based on proximity information from each of the mobile devices. Subgroup may include first mobile device and mobile devices that have provided proximity information that identifies first mobile device are being within the proximity sensitivity radiuses of the mobile devices, respectively. Server may then refine the fixed location of the first mobile device, which includes identifying an intersection of the proximity sensor sensitivity of each of the mobile devices that are in subgroup. Other embodiments are described.

23 Claims, 8 Drawing Sheets

(56) References Cited

U.S. PATENT DOCUMENTS

| | | |
|---|---|---|
| 2011/0134240 A1 | 6/2011 | Anderson et al. |
| 2011/0171973 A1 | 7/2011 | Beck et al. |
| 2011/0282799 A1 | 11/2011 | Huston |
| 2012/0235865 A1 | 9/2012 | Nath et al. |
| 2012/0246195 A1 | 9/2012 | McFall et al. |
| 2012/0311031 A1 | 12/2012 | Latta et al. |
| 2012/0329484 A1 | 12/2012 | Rothschild |
| 2013/0095854 A1 | 4/2013 | Scales |

* cited by examiner

US 9,301,095 B2

APPARATUS AND METHOD FOR DETERMINING AND PROVIDING RELATIVE VALUES OF CONTACTS ASSOCIATED WITH MOBILE DEVICES WITHIN A LOCATION-BASED GROUP

CROSS-REFERENCE TO RELATED APPLICATIONS

This patent application is related to U.S. patent application Ser. No. 14/023,225, filed on Sep. 10, 2013 and the entirety of which is incorporated herein by reference.

FIELD

Embodiments of the invention relate generally to an apparatus and method for determining and providing relative values of contacts associated with mobile handheld sensor devices (MHDS) (e.g., mobile devices) within a location-based group.

BACKGROUND

Currently, mobile devices such as smart mobile phones include mapping applications that may be used to show the current location of the user of the mobile device on the mobile device's display. These applications may include for instance: geo-fencing, geo -location, emergency contact and access, and mobile tracking. While these mapping applications can provide approximate location of a tracked mobile device, they do not provide indication regarding the availability of the tracked mobile device to be contacted.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

Figure 1:
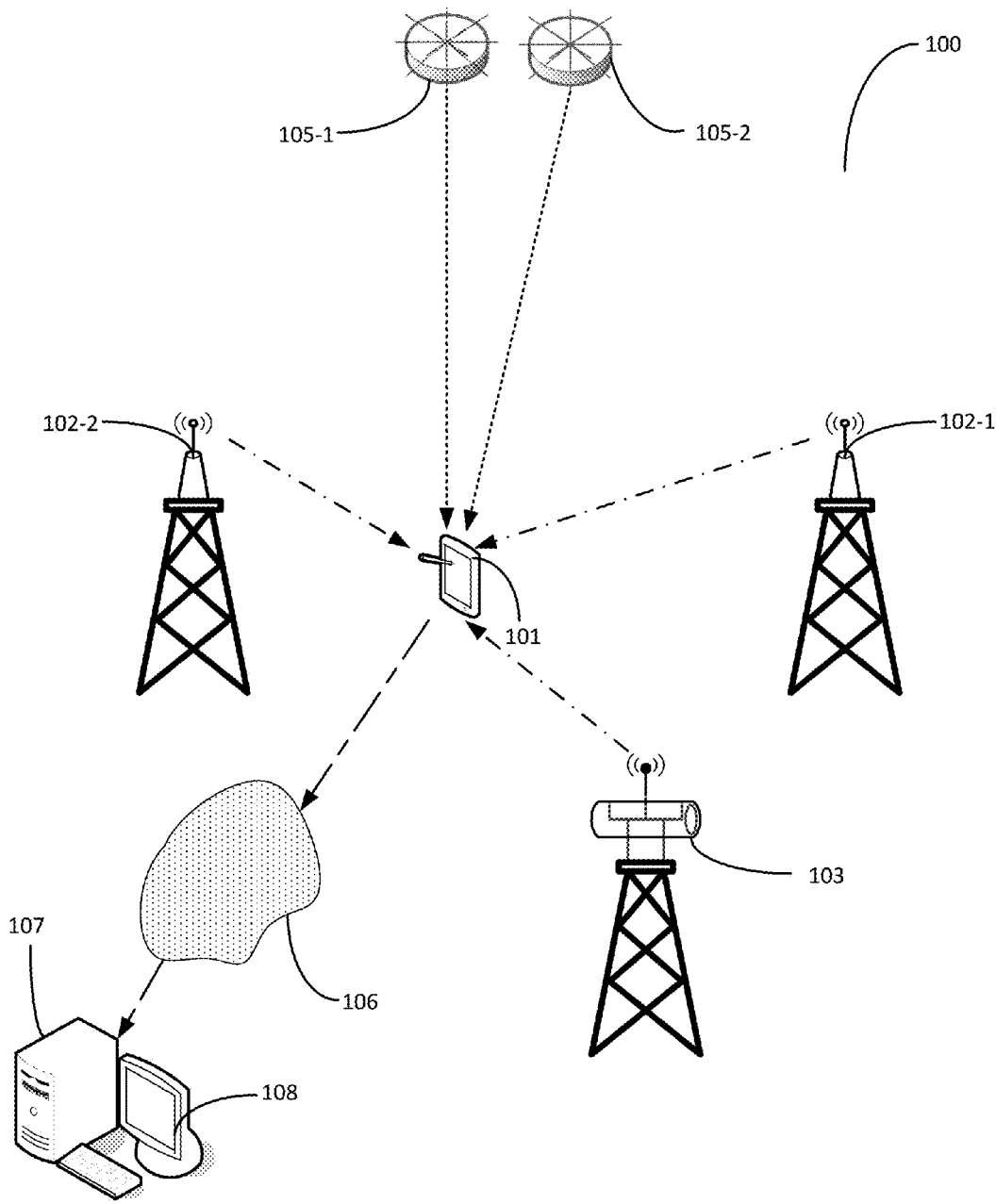
FIG. 1 illustrates a prior art system for tracking and establishing the location of mobile devices (i.e., "location fixing").

Identifying the location of mobile devices has become a need in many applications such as geo-fencing (e.g., creating a virtual perimeter on a map representing a real-world geographic area), geo-location (e.g., assessing the real-world geographic location of an object or user), providing emergency contact, mobile tracking (e.g., tracking the real-world location of a mobile device) and personal identification, etc. . . . . The geo-positioning systems (GPS) using satellites, Wi-Fi hotspots and cellular towers (triangulation method) for location fixing of mobile handheld sensor devices (MHSDs), such as cell phones, tablet computers, other mobile communication and display devices, have become more common with the increase in the number of MHSDs and in the accessibility of wireless connectivity. FIG. 1 illustrates a prior art system for tracking and establishing the location of mobile device (MHSD 101) (i.e., "location fixing"). The system 100 illustrates a mobile device (MHSD) 101 being tracked which may be portable computers such as laptop, notebook, tablet, and handheld computers or may also take the form of other types of devices, such as mobile telephones, media players, personal data organizers, handheld game platforms, cameras, and/or combinations of such devices. The tracking server 107 included in the system 100 links to the registered mobile device 101 over a network 106 (e.g., Cloud Network or Internet) to collect and transfer location data. Specifically, the server 107 requests location data from the MHSD 101 in order to display the location of the MHSD 101 on the display device 108. The MHSD 101 may extract its location data upon receiving the request from the server 107 by using its internal sensors and radios and by connecting to the Global Positioning System (GPS) 105-1 and 105-2. Thus, the GPS 105-1 and/or 105-2 may be used to generate a location fix for the MHSD 101. The MHSD 101 may also extract its location data by using its internal sensors and radios and by triangulation using the Wireless (WiFi) towers 102-1 and 102-2 and/or WiFi base station 103. Thus, the local wireless towers 102-1, 102-2 and Wi-Fi 103 sensors or other available fixed sensors may also be used to identify and fix the location of a MHSD 101 by triangulation. The use of the GPS 105-1 and 105-2 and the triangulation methods can be combined to improve the location identification of the MHSD 101. This information is transmitted over the network (or cloud) 106 to a tracking and monitoring server 107 where it is displayed on the server display screen 108. The server 107 also ensures that the location information is provided to the MHSD 101 is available for display on the MHSD 101 display screen 108. The positioning accuracy is limited by the inaccuracies of the sensors and reflections of the wireless signals due to neighboring structures (e.g., buildings).

Figure 2:
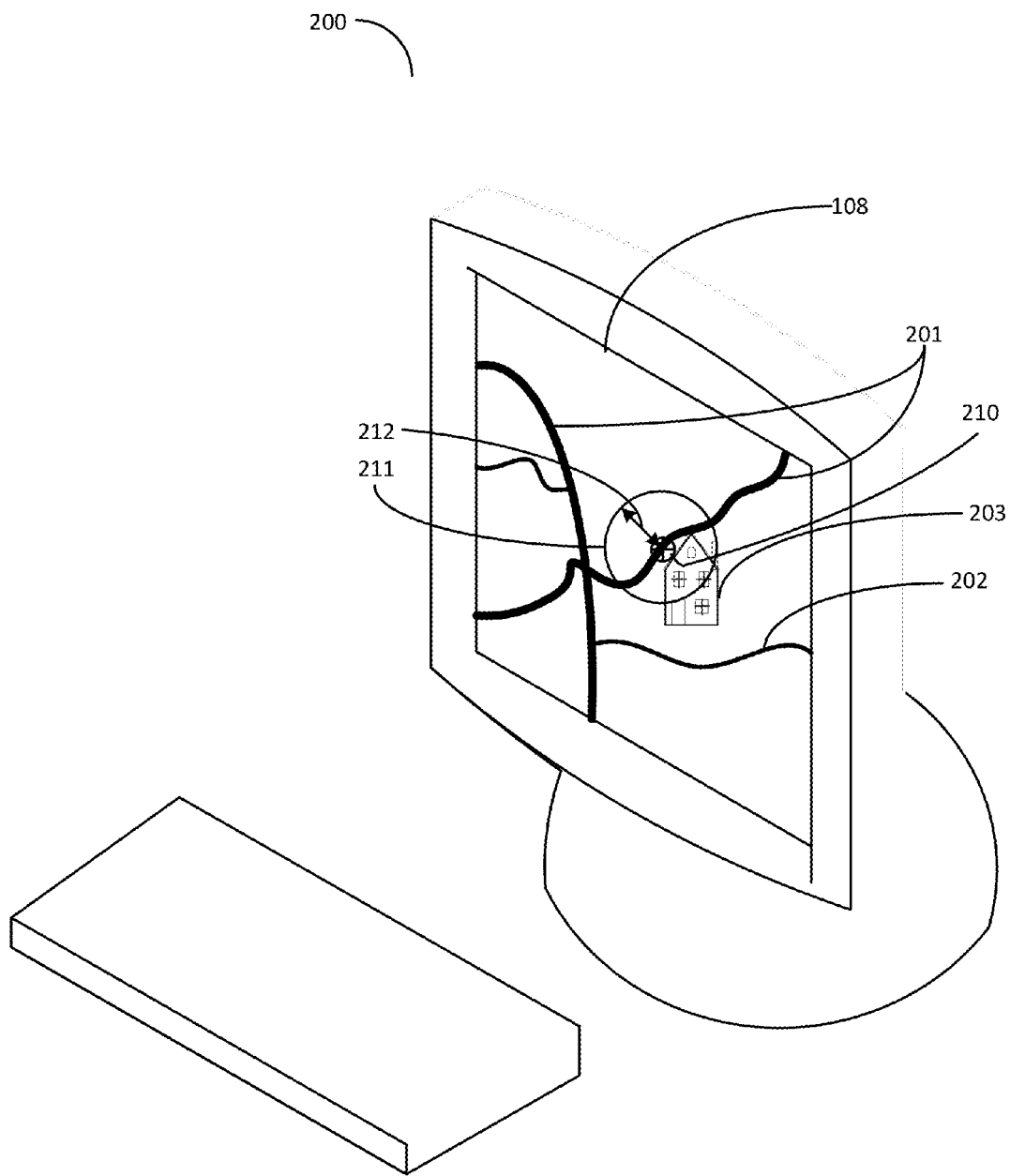
FIG. 2 illustrates the displayed location of the mobile device using the prior art system for tracking the location of a mobile device and location fixing the mobile device.

As shown in FIG. 1, current location fixing of the MHSD 101 using the server 107 and display 108 with communicable linking via the internet 106, tracks the physical location of the MHSD 101, within large error bounds. FIG. 2 illustrates the displayed location of the mobile device (MHSD 101) using the prior art system for tracking the location of a mobile device (MHSD 101) and location fixing the mobile device (MHSD 101). As shown in FIG. 2, the display 200 on a display device 108 includes a representation a map with major roads 201, minor roads 202 and buildings 203 and 204. The map also includes the location 210 of the MHSD 101. In this prior system 100, the location 210 is not accurate but rather it is located within the location fixing accuracy of the MHSD 101's sensor and may further be affected by the reflections from the MHSD 101's surroundings (e.g., buildings). In other words, although the location of the MHSD 101 is shown at location 210 on screen, the accuracy of the location 210 is dependent on the sensitivity of the sensors used to fix the location and the bounce range limit of sensing. FIG. 2 illustrates the sensor sensitivity or sensor accuracy limit 211 of the mobile device 101. The possible error in the location of MHSD 101 can be as much as the area within the sensor error radius 212. Accordingly, actual location of the mobile device 101 may be anywhere within the area having an error radius 212. Therefore, even when the mobile device 101 is within the building 203, the location of the mobile device 101 can be shown on display device 108 as being outside of the building 203. This location information (e.g., the location 210 of the MHSD 101) is also provided to any explicit groups who are part of the MHSD 101's explicitly approved tracking group for display on their display screens. For instance, the explicitly approved tracking groups may be a group of contacts associated with MHSDs, respectively, that have been approved by the user of the MHSD 101 to receive location information associated with the MHSD 101. The explicitly approved tracking groups, for instance, may have created in applications that that allow users to track the location of their friends. Though such applications provide an approximate location of the tracked MHSD, the applications do not improve the location fixing of the MHSDs by, for instance, linking the location of the MHSD 101 and MHSDs included in the explicitly approved tracking groups to local structures or institutions on the map based on historical data that includes locations previously frequented by the MHSDs, respectively. Further, these current applications do not identify the location associated with the MHSD 101 using the previously frequented structures or locations of the MHSD 101. Further, in the case of an emergency, while these current applications are usable to identify MHSDs included in an explicitly approved tracking group (e.g., friends) who are close by, but these applications do not provide any indication of the availability of the friends to respond to a distress call while at their respective locations.

Accordingly, it would be useful to have a method and system that can has a much more accurate location determining capability, with small error circle radius enabling accurate identification of the location of the MHSD. Using the more accurate location determination, the location of each tracked MHSD may further be linked to known structures and institutions. It will be further useful to have the historic data of identity of the structures and availability of the tracked MHSD, while at the specific location, for emergency access, to determine a relative distances. The relative distances for instance may be a relative value associated with a MHSD that is included in an explicitly approved tracking group (e.g., explicit group) to indicate the availability of each MHSD in the explicit group to respond to the MHSD 101.

As discussed above, the explicit group of MHSDs may include MHSDs of users (e.g., explicit group members) that have been selected by the user of the MHSD 101 to be emergency contacts. Accordingly, the MHSDs in the explicit group may be tracked and identified to determine whether there are explicit group members in the vicinity when an emergency or need occurs. The prior art tracking and display facility or applications allow for quick determination of the location of friends and family, based on the location of their personal phones or MHSDs. These are great tools for keeping track of people and their approximate locations using GPS tracking. However, these tools are not ideal for identifying the most available and accessible explicit group members, as these tools only provide only assess the geographic location of the MHSD without taking into account the associated user's routine or actions. For instance, the MHSD that is closest in distance to the location of the MHSD 101 (e.g., location of the need/emergency) may not be available to help because the closest MHSD may be engaged in an activity which is critical or that cannot be left unfinished.

Accordingly, in one embodiment of the invention, in order to determine the availability of a tracked individual (e.g., the explicit group member), it is necessary to identify the specific location, by site, of the individual and relate the identified specific location to the individual's routine activity at the site, which provides further indication of the individuals availability at that time. Further, according to one embodiment of the invention, in order to accurately identify a specific location site associated with an explicit group member as well as the MHSD 101, the tracking system may be one that has low error range. In one embodiment of the invention, a historic database of specific locations frequented by the MHSDs is included in the system to identify the routine of the MHSDs and to determine an availability criteria. In one embodiment, the tracking system generates, from the data collected, an availability criteria for the MHSDs being tracked. This availability criteria may then be combined with actual distances of the tracked MHSDs from the MHSD 101 (e.g., location of an emergency or urgent need) to generate a relative distance that indicates the availability of each tracked MHSDs in the explicit group to respond to the MHSD 101. Accordingly, the relative distance enables the MHSD 101 in need to access and call the appropriate MHSD for help.

Figure 3:
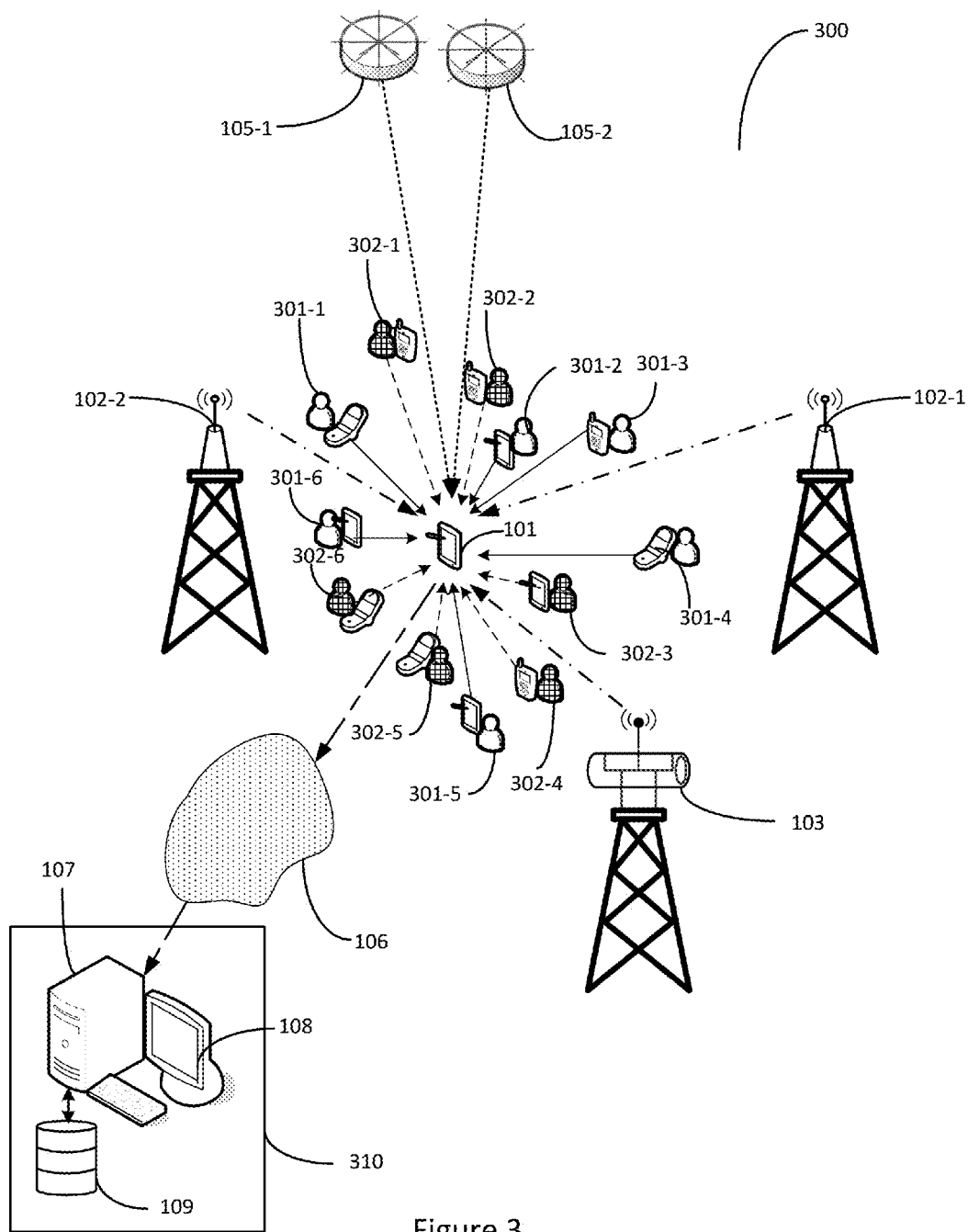
FIG. 3 illustrates a system for determining and providing relative values of contacts associated with mobile devices within a location-based group according to an embodiment of the invention.

FIG. 3 illustrates a system for determining and providing relative values of contacts associated with mobile devices within a location-based group according to an embodiment of the invention. The system 300 includes a set of MHSDs 301-1 to 301-6 forming a first explicit group (1) with the MHSD 101, and another set of MHSDs 302-1 to 302-6 forming a second explicit group (2) with MHSD 101. The MHSDs included in the first and second explicit groups are explicitly registered and linked with a tracking and monitoring server system (TMSS) 310 that monitors and tracks the registered groups of MHSDs over the internet (or cloud) 106. For example, the MHSDs included in the first and second explicit groups may be members of another social group registered and enabled for tracking and monitoring as a group. The membership to these social networks may include registration with one or more central servers as part of explicit groups, such as family group, friends group, extended family and friends group, sport and club groups etc. As shown in FIG. 3, the tracking and monitoring server system comprise at least a server 107 including a processor, at least a data input/output device 108, and at least a storage unit 109, capable of being partitioned into multiple data storage regions or databases. Moreover, the combinations of the first and second explicit groups may also form implicit groups of mobile devices that have common properties but are not linked by an explicit registration for tracking. For instance, implicit groups include all registered devices, all members of a club, etc. Accordingly, in FIG. 3, the two sets of registered MHSDs 301-1 to 301-6 and 302-1 to 302-6 together form an implicit group of MHSDs. These registered MHSDs with additional groups of MHSDs that are also registered with the monitoring and tracking server system can form an implicit group of all registered MHSDs.

The initial tracking may be done using GPS satellites 105-1 and 105-2 and triangulation by the cell towers 102-1 and 102-2 and Wi-Fi 103. Accordingly, in one embodiment, the tracking and monitoring server 107 links to each of the MHSDs in system 300 over a network 106 (e.g., Internet, Cloud Network) to collect and transfer location data and proximity information. The server 107 may include a processor, a communication interface and a memory storage. Specifically, the server 107 may request location data and the proximity information from each of the MHSDs 101, 301-1 to 301-6 and 302-1 to 302-6. For instance, the location data received from a first MHSD 101 includes a fixed location of the first MHSD 101. The MHSDs 101, 301-1 to 301-6 and 302-1 to 302-6 may extract their location data, respectively, upon receiving the request from the server 107 by using its internal sensors and radios and by connecting to the Global Positioning System (GPS) 105. The MHSDs 101, 301-1 to 301-6 and 302-1 to 302-6 may also extract their location data, respectively, by using its internal sensors and radios and by triangulation using the Wireless (WiFi) towers 102-1, 102-2 and/or WiFi base station 103. In some embodiments, the proximity information received from the first MHSD 101 may include an identification of MHSDs that are within a proximity sensitivity radius of the first MHSD 101. This tracking information is transmitted to the tracking server system over the network 106 (e.g., Internet, Cloud Network). This tracking information is further refined and the error bounds associated with the MHSDs are further improved by using the proximity information and proximity intersection data from the explicit and implicit groups of registered MHSDs. For instance, the proximity information received by the server 107 from the first MHSD 101 may include an identification of the proximate MHSDs. The server 107 may then be able to use the proximity information from the proximate MHSDs identified to refine the position of the MHDS 101 by using the intersection of the proximity regions. Accordingly, the location of the tracked MHSD 101 is further refined and the error of location fixing is reduced.

In one embodiment, the location accuracy of the MHSDs is also improved by combining the location of an MHSD 101 with stored historic data of identifiable and known locations frequented by the MHSD 101. The server 107, based on the identified location and the behavioral pattern/associations of an MHSD 101 at the identified location, fixes a value for availability of the MHSD 101 at the frequented structure identified.

For instance, in order to further refine the fixed location of the first MHSD 101, the server 107 may determine if a database 109 in FIG. 3 includes a location that is associated with the first MHSD 101 and that is close to the fixed location or the intersection of the proximity regions. Alternatively, rather than being separate from the server 107, the database 109 being checked for a location that is associated with the first MHSD 101 may also be a database that is included in the server 107. Location data associated with each of the MHSDs in the system 300 may be collected by the server 107 which stores the data in a database memory. Referring back to FIG. 3, the location associated with the first MHSD 101 may include at least one of: (i) an explicit group location that is associated with an explicit group that includes the first MHSD 101, (ii) an implicit group location that is associated with an implicit group that includes the first MHSD 101, and (iii) a historic location that is associated with the first MHSD 101, wherein the historic location is a location previously frequented by the first MHSD 101.

In one embodiment, the ID of the MHSD 101, and the location information of the location that is associated with the first MHSD 101 is stored in the database 109. The database 109 may be a historic location-availability (LA) database. This historic LA database 109 may be updated over time, based on actual availability data generated for the MHSD 101 at each location associated with the first MHSD 101. A similar process is performed determine the availability for each of the registered MHSDs belonging to explicit and implicit groups while at each of their respectively associated locations (e.g., preferred locations). Hence, the historic LA database 109 may contain the historic LA data of all identifiable frequented locations and an assessment of availability for the individual registered MHSDs while at these locations. This assessment of availability is used to generate a 'relative availability criteria index' (RACI) table for each of the tracked and monitored MHSDs on a continuous basis at all their preferred locations. The generated RACI combined with actual distances to explicit group members is used by the tracking and monitoring server system to generate a relative distance (RD) (or relative value) based on distance and availability for use by an MHSD 101 in need during emergencies. The RD provides to an MHSD 101 (e.g., the MHSD in need) the ability to identify and contact explicit group members in the vicinity, for fastest response, in case of an emergency.

Figure 4A:
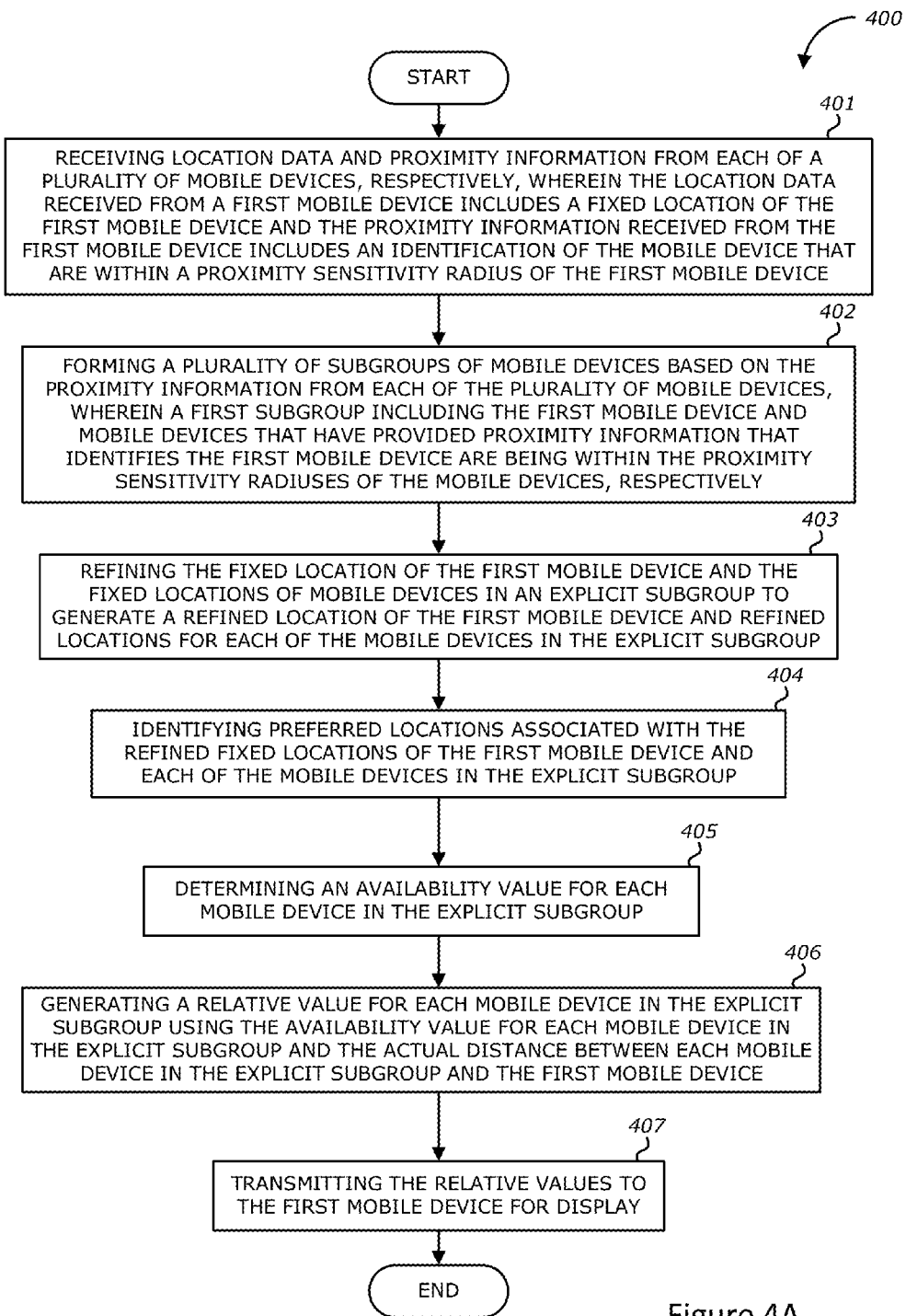
FIG. 4A illustrates a flow chart 400 for determining and providing relative values of contacts associated with mobile devices within a location-based group according an embodiment of the invention.

FIG. 4A illustrates a flow chart 400 for determining and providing relative values of contacts associated with mobile devices within a location-based group according an embodiment of the invention. The method 400 is an embodiment of the invention more accurately performs location fixing of the MHSDs in an explicit group, establishes a set of preferred frequented locations MHSDs, determines an availability for the MHSD at given locations based on the identity of the location and the historic availability of the MHSDs at the locations.

More specifically, the method 400 starts at Block 401 with the server 107 receiving location data and proximity information from each of a plurality of mobile devices, respectively. For instance, the location data received from a first MHSD 101 included in the MHSDs includes a fixed location of the first MHSD 101. The proximity information received from the first MHSD 101 includes an identification of MHSDs that are within a proximity sensitivity radius of the first MHSD 101. The plurality of mobile devices from which the server 107 receives location data and proximity information includes MHSDs included in an explicit group. The first MHSD 101 may be included in the explicit subgroup. In some embodiments, the explicit subgroup includes the MHSDs that are explicitly identified by the first MHSD 101 to be emergency contacts.

At Block 402, the server 107 may form a subgroup of MHSDs based on the proximity information from each of the plurality of MHSDs. The subgroup may include the first MHSD and the MHSDs that have provided proximity information that identifies the first MHSD 101 as being within the proximity sensitivity radiuses of the MHSDs, respectively. At Block 403, the server 107 may refine the fixed location of the first MHSD 101 and the fixed locations of the MHSDs in the explicit subgroup to generate a refined location of the first MHSD 101 and refined locations for each of the MHSDs in the explicit subgroup. At Block 404, the server 107 identifies a preferred location associated with the refined fixed locations of the first MHSD 101 and each of the MHSDs in the explicit subgroup, respectively.

For instance, the server 107 may identifies for each MHSDs a set of preferred frequented locations and structures, and determines the identity of the structures by using the information stored in a database 109. The database 109 may store historic data of frequented locations and structures. At Block 405, the server 107 determines an availability value for each MHSD in the explicit subgroup. Referring to FIG. 4D which illustrates a flow diagram of an example method for determining the availability value according to an embodiment of the invention. In this embodiment, the availability value is based on and associated with each of the MHSDs in the explicit subgroup and the refined fixed locations of each of the MHSDs in the explicit subgroup. Accordingly, the server 107 may determines an availability of the MHSD at the structure based on the identity of the structure and the past availability data information stored in a historic location-availability (LA) database 109. As shown in FIG. 4D, to determine the availability value at Block 405, the method starts at Block 430 with the server 107 determining, for each MHSD in the explicit subgroup, whether the refined fixed location of the MHSD is stored in a historic location-availability database and associated with the MHSD. For instance, the server 107 may receive a refined fixed location of the MHSD and identifies a structure that is associated with the refined fixed location. The historic location-availability database may include a set of preferred frequented structures for each MHSD. At Block 431, for each MHSD in the explicit subgroup, when the refined fixed location of the MHSD is stored in the historic location-availability database, the server 107 obtains an assessment of availability associated with the refined fixed location of the MHSD and the identification of MHSD. The assessment of availability may be stored in the historic location-availability database in association with the MHSD. For instance, the assessment of availability for an MHSD at each location (e.g., the preferred frequented structure, refined location, etc.) may be stored in the database and updated using collected data of availability from the MHSD at that given location. At Block 432, for each MHSD in the explicit subgroup, the server 107 generates an availability value based on the assessment of availability obtained.

In some embodiments, the server uses the identity of structures and the historic data of availability for each of the plurality of MHSDs at all their preferred frequented structures and stores the availability data in the LA database linked to the ID of the respective MHSD database. Thus, the server 107 is updating the availability data and the preferred locations for each MHSD in the database 109 periodically for all registered MHSDs.

At Block 406, the server 107 generates a relative value for each MHSD in the explicit subgroup using the availability value for each MHSD in the explicit subgroup and the actual distance between each MHSD in the explicit subgroup and the first MHSD 101. For instance, the server 107 using the historic LA data in the database 109 generates a relative availability criteria index (RACI) for all the registered members at each of their preferred frequented locations (see Table 1). The RACI hence provides a real time measure of availability for each of the registered MHSDs at each of their preferred frequented locations. The server 107 may then use the RACI in combination with the actual distance from the MHSD in the explicit group to the site of an emergency (e.g., refined location of the first MHSD 101) to generate a relative distance (RD) (e.g., the relative value) for all explicit group members associated with the MHSD 101 having the emergency.

At Block 407, the server 107 transmits the relative values to the first MHSD 101 for display. Thus, the server 107 may provide to the MHSD 101 requesting assistance on its display the location and RD data to enable the MHSD to contact the most appropriate explicit group members for immediate assistance. In one embodiment, the explicit group members having low RD values are the most accessible (See Table 2). In that embodiment, the low RD values indicate to the MHSD the highest probability of the explicit group member MHSD being available and at a short distance from the point of emergency to provide immediate assistance to the requesting MHSD. The server 107 may also transmit the relative values to the display device 108 for display. The display device 108 may display the relative values on a map as well as display the refined location of the first MHSD 101 and the refined locations of each MHSD in the explicit group on the map. Accordingly, using the relative value for each of the MHSDs in the explicit group, the MHSD 101 is able to determine the most available MHSD in the explicit group to respond to the emergency.

Figure 4B:
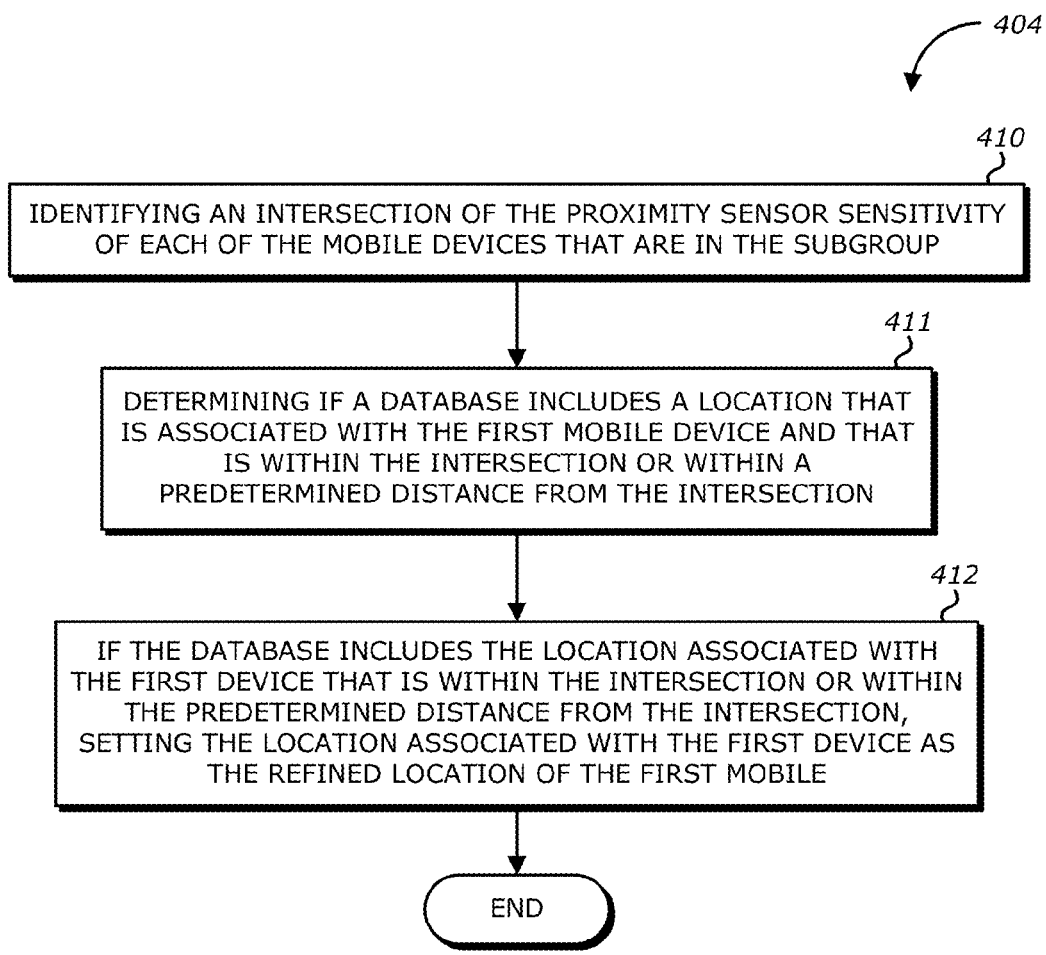
FIG. 4B illustrates a flow diagram of an example method for refining the location of a mobile device according to an embodiment of the invention.

FIG. 4B illustrates a flow diagram of an example method for refining the location of a MHSD according to an embodiment of the invention. In order to refine the location of the first MHSD 101 at Block 403 of FIG. 4A, the server 107 may identify an intersection of the proximity sensor sensitivity of each of the MHSDs 101, 301-1 to 301-6 and 302-1 to 302-6 that in the subgroups at Block 410. At Block 411, the server 107 may determine if a database 109 includes a location associated with the first MHSD 101 that is within the intersection or within a predetermined distance from the intersection and at Block 412, if the database 109 includes the location associated with the first MHSD 101 that is within the intersection or within the predetermined distance from the intersection, the server 107 may set the location associated with the first MHSD 101 as the refined location of the first MHSD 101. In one embodiment, the location associated with the first MHSD 101 that is stored in the database 109 may include historic data on the first MHSD 101's previously frequented locations. Accordingly, if the first MHSD 101's previously frequented location falls within the intersection, the server 107 may set the previously frequented location as the refined location of the first MHSD 101.

Figure 4C:
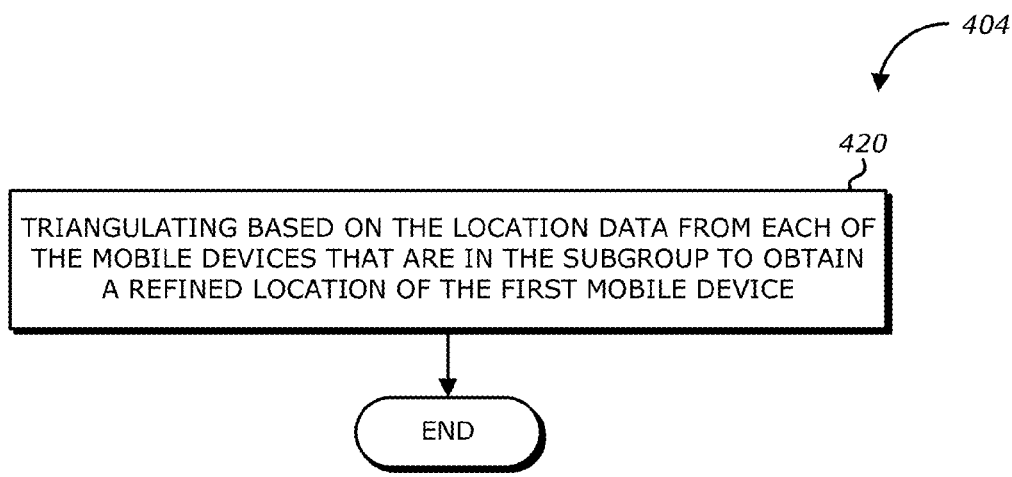
FIG. 4C illustrates a flow diagram of an example method for refining the location of a mobile device according to an embodiment of the invention.
Figure 4D:
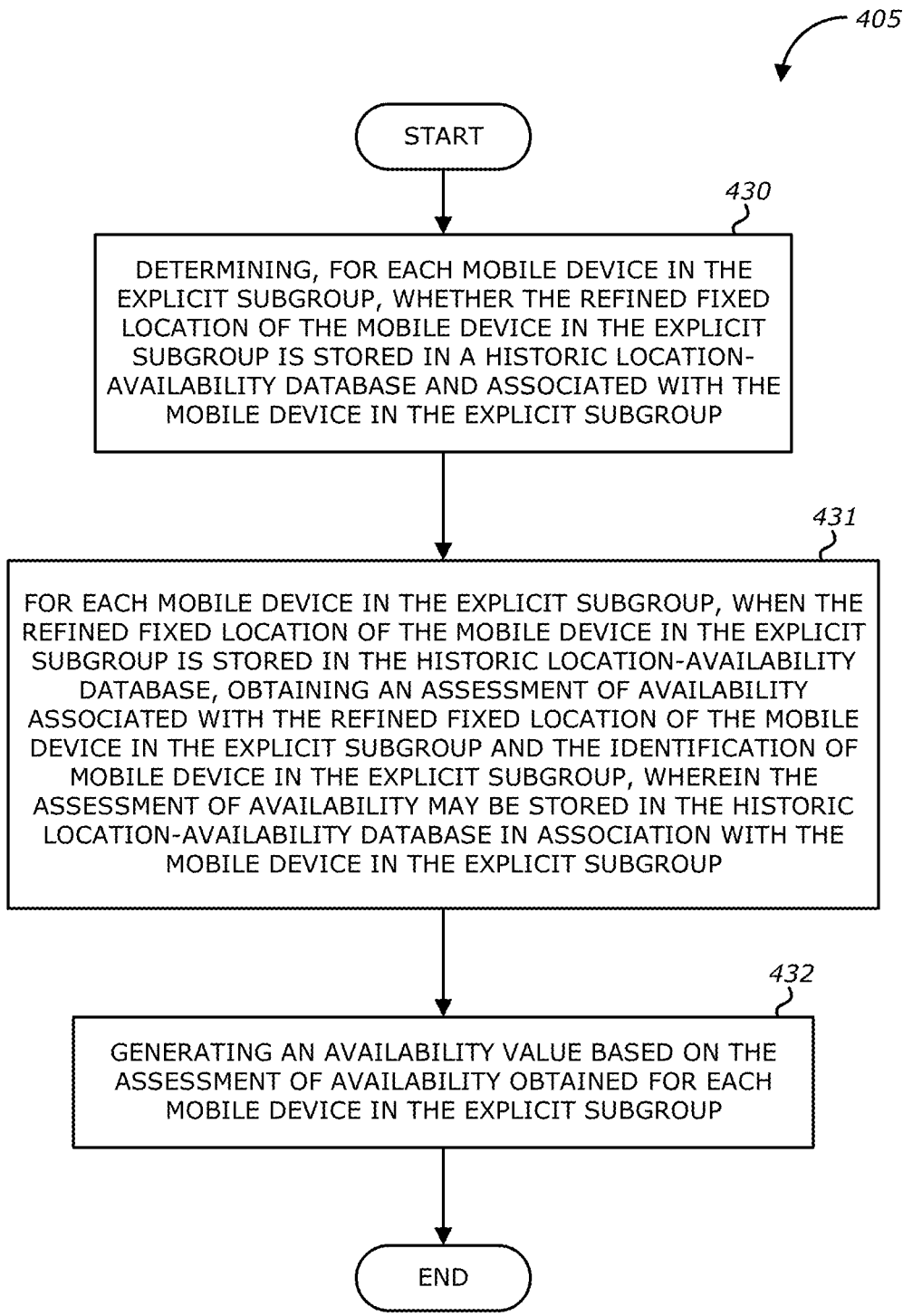
FIG. 4D illustrates a flow diagram of an example method for determining the availability value according to an embodiment of the invention.

FIG. 4C illustrates a flow diagram of an example method for refining the location of a MHSD according to another embodiment of the invention. In this embodiment, in order to refine the location of the first MHSD 101 at Block 403 of FIG. 4A, the server 107 may triangulate based on the location data from each of the mobile devices 101, 301-1 to 301-6 and 302-1 to 302-6 that in the subgroup to obtain a refined location of the first MHSD 101 (Block 420). Similarly, the methods in FIGS. 4B and 4C may be applied to refine the location of the plurality of MHSDs in the explicit group.

Figure 5:
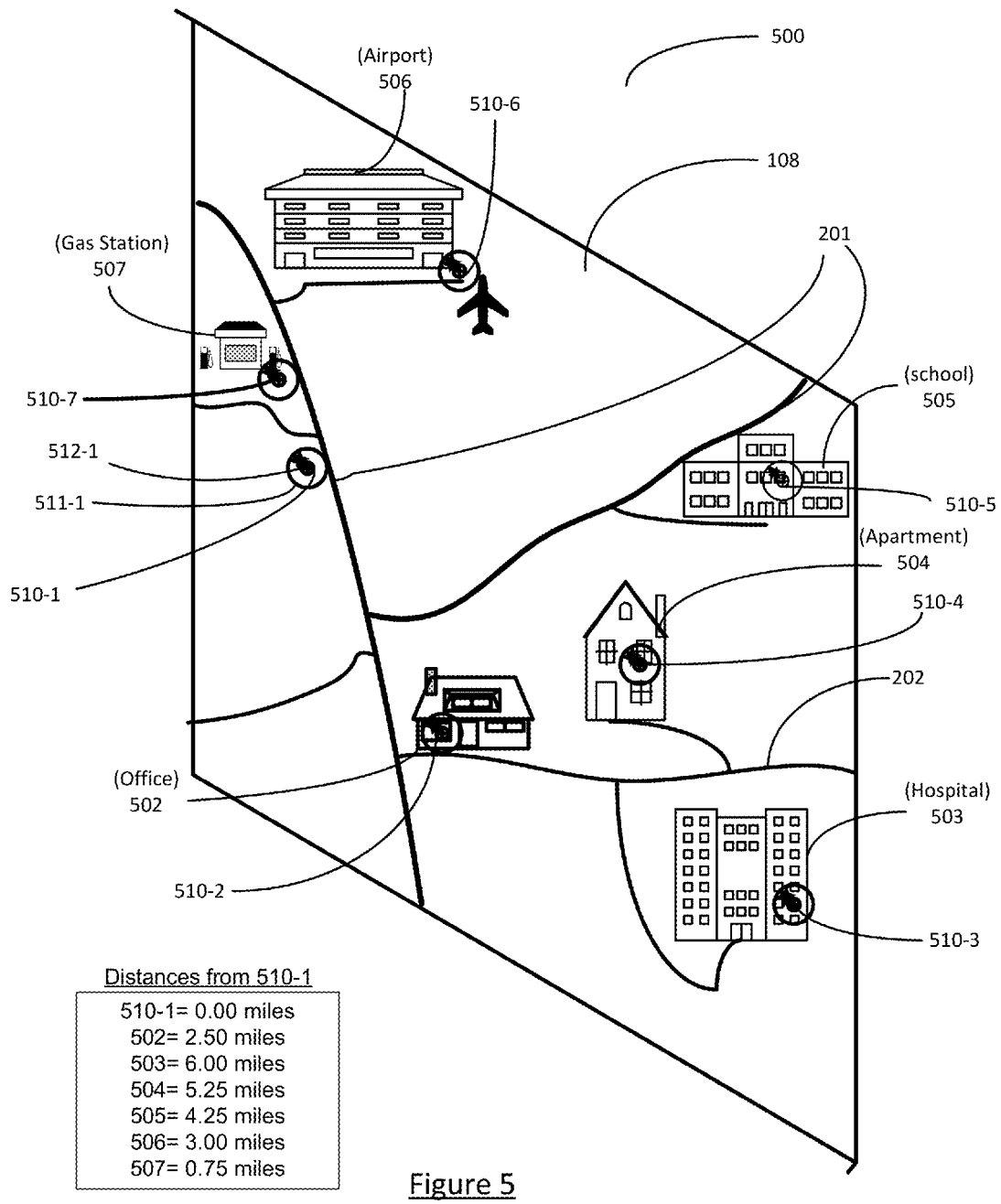
FIG. 5 illustrates the displayed location of the mobile device and the displayed location and actual distances of the mobile devices in an explicit group from the mobile device according to an embodiment of the invention.

FIG. 5 illustrates the displayed location of the mobile device and the displayed location and actual distances of the mobile devices in an explicit group from the mobile device according to an embodiment of the invention. In FIG. 5, an emergency incident where in the MHSD 510-1 is in need of help is illustrated. MHSD 510-1 has six explicit group members 510-2 to 510-7, in the vicinity (within reachable distances). The location fixing and refining process as described previously has enabled the error bound 511-1 of the MHSD 510-1 shown to be reduced to have a radius of 512-1. Similar accurate location fixes have been also implemented for the other MHSDs, 510-2 to 510-7. This allows the MHSDs to be identified and located with precision at locations and structures with reliable certainty. In FIG. 5, MHSD 510-2 is identified as being in an office 502, MHSD 510-3 is at the hospital 503, MHSD 510-4 is at the apartment 504, MHSD 510-5 is at school 505, MHSD 510-6 is at the airport, and MHSD 510-7 is at a gas station 507. The displayed map in FIG. 5 also includes the actual distances from the MHSDs in the explicit group to the site of the emergency for MHSD 510-1.

Table 1 is an exemplary computation of the relative availability criteria index (RACI) for the explicit members 510-2 to 510-7 shown on FIG. 5 based on the historic availability data at their refined locations according to an embodiment of the invention. The RACI is based on the availability at a site as assessed according to historic data and is then ranked according to an assessment of availability of the user of the MHSD at the time of need. In Table 1, the higher value of the RACI indicates higher availability. As an example, the availability is estimated to be nearly '0' for a doctor 510-5 at a hospital 505 as well as a person 510-6 going out on a flight at the airport 506. However, the doctor may be available for extreme emergencies while the person on a plane will be completely unavailable for help. These factors are thus also considered in fixing the RACI at any moment in time. By knowing the regular routines of the MHSDs, such a ranking is made possible.

TABLE 1

Example of availability criteria index from historic data for specific locations frequented by the MHSDs

| Sr. # | Location ID | Frequented Location Description | Historic availability | Relative Availability Criteria Index (RACI) |
|---|---|---|---|---|
| 1 | 502 | Office | 3 | 4 |
| 2 | 503 | Hospital | 0 | 2 |
| 3 | 504 | Apartment | 4 | 6 |
| 4 | 505 | School | 2 | 3 |
| 5 | 506 | Airport | 0 | 1 |
| 6 | 507 | Gas station | 4 | 5 |

Table 2 is an exemplary method of generation of the relative distance RD using the actual distance ranking from the distances to the locations of the explicit group member MHSDs in the vicinity to the emergency location of MHSD 510-1 and combining it with the RACI. The relative distance RD ("relative value") thus provides an estimate of the fastest available support during an emergency. In the example in Table 2 the value of RD is a simple function of the distance rank and RACI. It is possible to use more complex functions to create a more accurate relative distance assessment, but Table 2 is provided as a simple example of such RD computation as per an embodiment of the invention.

TABLE 2

Example of generation of Relative value of distance for emergency contact

| Sr. No. | Location ID | RACI (p) | Distance miles | Distance rank (q) | Value of (z) | Relative Distance (RD) |
|---|---|---|---|---|---|---|
| 1 | 501 | — | 0 | — | — | — |
| 2 | 502 | 4 | 2.50 | 5 | 4.2 | 0.24 |
| 3 | 503 | 2 | 6.00 | 1 | 2.0 | 0.56 |
| 4 | 504 | 6 | 5.25 | 2 | 5.4 | 0.19* |
| 5 | 505 | 3 | 4.25 | 3 | 2.6 | 0.33 |
| 6 | 506 | 1 | 3.00 | 4 | 1.8 | 0.63 |
| 7 | 507 | 5 | 0.75 | 6 | 5.2 | 0.19* |

In the example in Table 2, the smaller RD values indicate the best available contacts for emergency assistance. The value of (z) is the inverse of the RD values.

In one embodiment, the relative distance $(RD)=1/(z)$; where $(z)=f1(p) \times f2(q)$. $(z)=0.8p \times 0.2q$ may be used as an example. In the mathematical equation for the z shown above, $f1(p)$ indicates a first function of p, which is the relative availability criteria index (RACI) as shown in the Table 2, and $f2(q)$ indicate a second function of q, which is the distance rank as shown in the Table 2. Thus, z is, in this case, a function of these two functions: one relating to p and the other relating to q. Accordingly, in this example, RD is a function of (z) which is a function of (p) and (q).

Figure 6:
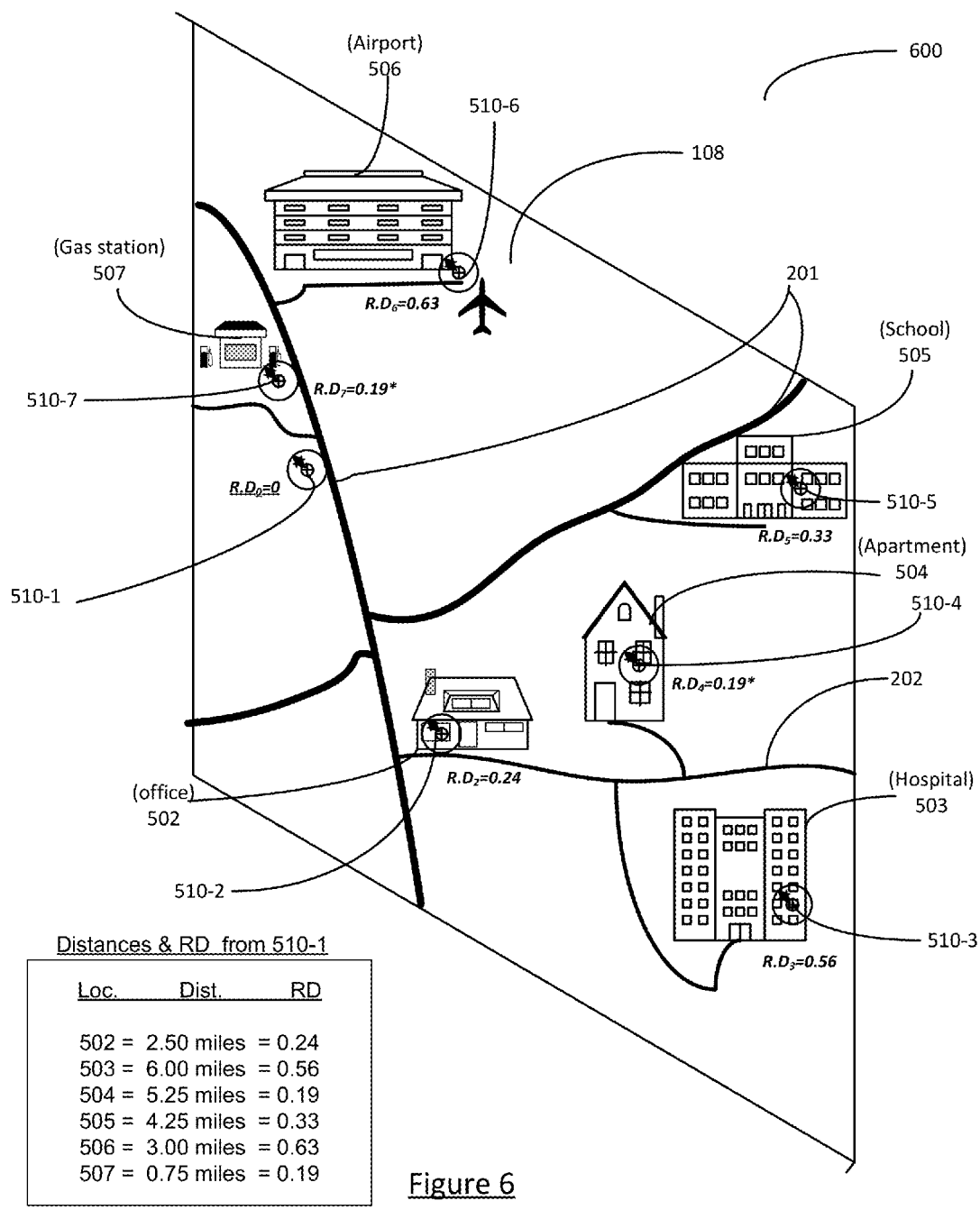
FIG. 6 illustrates the displayed location of the mobile device and the displayed location and the relative distances of the mobile devices in an explicit group according to an embodiment of the invention.

FIG. 6 illustrates the displayed location of the mobile device and the displayed location and the relative distances of the mobile devices in an explicit group according to an embodiment of the invention. In FIG. 6, the RD and location data is displayed on the MHSD 510-1 in need of assistance to enable the MHSD 510-1 to determine the best explicit group member to call for assistance. For example, both the MHSDs 510-4 at the apartment 504 and MHSD 510-7 at the gas station have the lowest and equal RD values of 0.19, while MHSD 510-2 at the office has an RD value of 0.24. The MHSD 510-1 will have to decide based on the association it has with the available MHSDs with low RD values, as to which of these MHSDs is to be contacted for emergency assistance.

Embodiments of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of determining and providing relative values of contacts associated with mobile devices within a location-based group comprising:
   identifying, by a processor, preferred locations associated with refined fixed locations of a first mobile device included in a plurality of mobile devices, and each mobile device in an explicit subgroup, respectively, wherein the plurality of mobile devices includes the mobile devices included in the explicit subgroup, wherein the explicit subgroup includes the first mobile device;
   determining, by the processor, an availability value for each of the mobile devices in the explicit subgroup based on an identification of each of the mobile devices in the explicit subgroup and the refined fixed locations of each of the mobile devices in the explicit subgroup, wherein the availability values are numerical values that respectively rate availability of users of each of the mobile devices to respond to the first mobile device;
   generating, by the processor, a relative value for each of the mobile devices in the explicit subgroup using the availability values for each mobile device in the explicit subgroup and the actual distance between each mobile device in the explicit subgroup and the first mobile device, wherein the relative values are values that respectively rate response times for each of the mobile devices to the first mobile device; and
   transmitting, by the processor, the relative values to the first mobile device for display.

2. The method of claim 1, further comprising:
   receiving, by the processor, location data and proximity information from each of the plurality of mobile devices, respectively, wherein the location data received from a first mobile device included in the plurality of mobile devices includes a fixed location of the first mobile device and the proximity information received from the first mobile device includes an identification of mobile devices that are within a proximity sensitivity radius of the first mobile device:
   forming by the processor a plurality of subgroups of mobile devices based on the proximity information from each of the plurality of mobile devices, wherein a first subgroup including the first mobile device and mobile devices that have provided proximity information that identifies the first mobile device are being within the proximity sensitivity radiuses of the mobile devices, respectively;
   refining, by the processor, the fixed location of the first mobile device to generate a refined location of the first mobile device and a fixed location of each of the mobile devices in the explicit subgroup to generate a refined location for each of the mobile devices in the explicit subgroup, wherein refining the fixed location includes identifying intersections of the proximity sensor sensitivity of each of the mobile devices that in the subgroups, respectively.

3. The method of claim 2, wherein the refining the fixed location of the first mobile device further comprises:
   determining by the processor, if a database includes a location associated with the first mobile device that is within the intersection of the first mobile device or within a predetermined distance from the intersection of the first mobile device, and
   if the database includes the location associated with the first device that is within the intersection of the first mobile device or within the predetermined distance from the intersection of the first mobile device, setting the location associated with the first device as the refined location of the first mobile,
   wherein the location associated with the first device includes at least one of (i) an explicit subgroup location that is associated with an explicit subgroup that includes the first mobile device, (ii) an implicit group location that is associated with an implicit group that includes the first mobile device, and (iii) a historic location that is associated with the first mobile device, wherein the historic location is a location previously frequented by the first mobile device.

4. The method of claim 2, wherein the refining, by the processor, the location of the first mobile device further comprises:
   triangulating based on the location data from each of the mobile devices that in the subgroup to obtain a refined location of the first mobile device.

5. The method of claim 2, further comprising
   updating a database to associate the refined location of the first mobile device with the first mobile device.

6. The method of claim 2, further comprising:
   transmitting the refined locations of the first mobile device and the mobile devices in the explicit subgroup to a display device to be displayed on a display device.

7. The method of claim 2, wherein identifying the preferred locations associated with the refined fixed locations of the first mobile device and each of the mobile devices in the explicit subgroup, respectively, comprises:
   determining, by the processor, if a database includes a preferred location associated with the first mobile device that is within the intersection of the first mobile device or within a predetermined distance from the intersection of the first mobile device; and
   determining, by the processor, if the database includes a preferred location associated with each of the mobile devices in the explicit subgroup that is within the intersection of each of the mobile devices in the explicit subgroup, respectively, or within a predetermined distance from the intersection of each of the mobile devices in the explicit subgroup, respectively.

8. An apparatus for determining and providing relative values of contacts associated with mobile devices within a location-based group comprising:
   a processor;
   a communication interface to:
      receive a location data and proximity information from each of a plurality of mobile devices, respectively, wherein the location data received from a first mobile device included in the plurality of mobile devices includes a fixed location of the first mobile device and the proximity information received from the first mobile device includes an identification of mobile devices that are within a proximity sensitivity radius of the first mobile device, wherein the plurality of mobile devices includes mobile devices included in an explicit subgroup, wherein the explicit subgroup includes the first mobile device; and
   a memory storage storing instructions that, when executed by the processor, causes the processor to:
      receive the location data and the proximity information from the communication interface,
      determine an availability value for each of the mobile devices in the explicit subgroup based on an identification of each of the mobile devices in the explicit subgroup and refined fixed locations of each of the mobile devices in the explicit subgroup, wherein the availability values are numerical values that respectively rate availability of users of each of the mobile devices to respond to a first mobile device;

generate a relative value for each of the mobile devices in the explicit subgroup using the availability values for each mobile device in the explicit subgroup and the actual distance between each mobile device in the explicit subgroup and the first mobile device, wherein the relative values are values that respectively rate response times for each of the mobile devices to the first mobile device; and signal to the communication interface to transmit the relative values to the first mobile device for display.

9. The apparatus of claim 8, further comprising:
a database storing data associated with a plurality of mobile devices,
wherein the memory storage storing instructions that, when executed by the processor, further causes the processor to:
form a plurality of subgroups of mobile devices based on the proximity information from each of the plurality of mobile devices, wherein a first subgroup including the first mobile device and mobile devices that have provided proximity information that identifies the first mobile device are being within the proximity sensitivity radiuses of the mobile devices, respectively,
refine the fixed location of the first mobile device to generate a refined location of the first mobile device and a fixed location of each of the mobile devices in the subgroup to generate a refined location for each of the mobile devices in the explicit subgroup, wherein refining the fixed location includes identifying intersections of the proximity sensor sensitivity of each of the mobile devices that in the subgroups, respectively, and
identify preferred locations associated with the refined fixed locations of the first mobile device and each of the mobile devices in the explicit subgroup, respectively.

10. The apparatus of claim 9, wherein the processor refines the fixed location of the first mobile device by:
determining if the database includes a location associated with the first mobile device that is within the intersection of the first device or within a predetermined distance from the intersection of the first device, and
if the database includes the location associated with the first device that is within the intersection of the first device or within the predetermined distance from the intersection of the first device, setting the location associated with the first device as the refined location of the first mobile,
wherein the location associated with the first device includes at least one of (i) an explicit subgroup location that is associated with an explicit subgroup that includes the first mobile device, (ii) an implicit group location that is associated with an implicit group that includes the first mobile device, and (iii) a historic location that is associated with the first mobile device, wherein the historic location is a location previously frequented by the first mobile device.

11. The apparatus of claim 9, wherein, when the processor executes the instructions stored in memory, the processor refines the fixed location of the first mobile device by:
triangulating based on the location data from each of the mobile devices that in the subgroup to obtain a refined location of the first mobile device.

12. The apparatus of claim 9, wherein when the processor executes the instructions stored in memory, the processor further:
update a database to associate the refined location of the first mobile device with the first mobile device.

13. The apparatus of claim 9, when the processor executes the instructions stored in memory, the processor further:
signals to the communication interface to transmit the relative values to a display device for display.

14. The apparatus of claim 9, wherein identifying the preferred locations associated with the refined fixed locations of the first mobile device and each of the mobile devices in the explicit subgroup, respectively, comprises the processor:
determining if a database includes a preferred location associated with the first mobile device that is within the intersection of the first mobile device or within a predetermined distance from the intersection of the first mobile device; and
determining if the database includes a preferred location associated with each of the mobile devices in the explicit subgroup that is within the intersection of each of the mobile devices in the explicit subgroup, respectively, or within a predetermined distance from the intersection of each of the mobile devices in the explicit subgroup, respectively.

15. A non-transitory computer-readable medium having stored thereon instructions that, when executed by a processor, causes the processor to perform a method of determining and providing relative values of contacts associated with mobile devices within a location-based group comprising:
determining an availability value for each mobile device in an explicit subgroup based on an identification of each of the mobile devices in the explicit subgroup and refined fixed locations of each of the mobile devices in the explicit subgroup, wherein a plurality of mobile devices includes mobile devices included in the explicit subgroup, wherein the explicit subgroup includes the first mobile device, wherein the availability values are numerical values that respectively rate availability of users of each of the mobile devices to respond to a first mobile device;
generating a relative value for each of the mobile devices in the explicit subgroup using the availability values for each mobile device in the explicit subgroup and the actual distance between each mobile device in the explicit subgroup and the first mobile device, wherein the relative values are values that respectively rate response times for each of the mobile devices to the first mobile device; and
transmitting the relative values to the first mobile device for display.

16. The non-transitory computer-readable medium of claim 15, having stored thereon instructions that, when executed by the processor, causes the processor to perform a method further comprising:
receiving location data and proximity information from each of the plurality of mobile devices, respectively, wherein the location data received from the first mobile device included in the plurality of mobile devices includes a fixed location of the first mobile device and the proximity information received from the first mobile device includes an identification of mobile devices that are within a proximity sensitivity radius of the first mobile device;

forming a plurality of subgroups of mobile devices based on the proximity information from each of the plurality of mobile devices, wherein a first subgroup including the first mobile device and mobile devices that have provided proximity information that identifies the first mobile device are being within the proximity sensitivity radiuses of the mobile devices, respectively;

refining the fixed location of the first mobile device to generate a refined location of the first mobile device and a fixed location of each of the mobile devices in the explicit subgroup to generate a refined location for each of the mobile devices in the explicit subgroup, wherein refining the fixed location includes identifying intersections of the proximity sensor sensitivity of each of the mobile devices that in the subgroups, respectively; and identifying preferred locations associated with the refined fixed locations of the first mobile device and each of the mobile devices in the explicit subgroup, respectively.

17. The non-transitory computer-readable medium of claim 16, wherein the refining the fixed location of the first mobile device further comprises:

determining by the processor, if a database includes a location associated with the first mobile device that is within the intersection of the first mobile device or within a predetermined distance from the intersection of the first mobile device; and if the database includes the location associated with the first device that is within the intersection of the first mobile device or within the predetermined distance from the intersection of the first mobile device, setting the location associated with the first device as the refined location of the first mobile, wherein the location associated with the first device includes at least one of (i) an explicit subgroup location that is associated with an explicit subgroup that includes the first mobile device, (ii) an implicit group location that is associated with an implicit group that includes the first mobile device, and (iii) a historic location that is associated with the first mobile device, wherein the historic location is a location previously frequented by the first mobile device.

18. The non-transitory computer-readable medium of claim 16, wherein the refining, by the processor, the location of the first mobile device further comprises:

triangulating based on the location data from each of the mobile devices that in the subgroup to obtain a refined location of the first mobile device.

19. The non-transitory computer-readable medium of claim 16, further comprising updating a database to associate the refined location of the first mobile device with the first mobile device.

20. The non-transitory computer-readable medium of claim 16, further comprising:

transmitting the relative values to a display device to be displayed on the display device.

21. The non-transitory computer-readable medium of claim 16, wherein identifying the preferred locations associated with the refined fixed locations of the first mobile device and each of the mobile devices in the explicit subgroup, respectively, comprises the processor:

determining if a database includes a preferred location associated with the first mobile device that is within the intersection of the first mobile device or within a predetermined distance from the intersection of the first mobile device, and determining if the database includes a preferred location associated with each of the mobile devices in the explicit subgroup that is within the intersection of each of the mobile devices in the explicit subgroup, respectively, or within a predetermined distance from the intersection of each of the mobile devices in the explicit subgroup, respectively.

22. A method of determining and providing relative values of contacts associated with mobile devices within a location-based group comprising:

determining, by a processor, an availability value for each mobile devices in an explicit subgroup based on an identification of each of the mobile devices in the explicit subgroup and a refined fixed locations of each of the mobile devices in the explicit subgroup, wherein the availability values are numerical values that respectively rate availability of users of each of the mobile devices to respond to a first mobile device;

generating, by the processor, a relative value for each of the mobile devices in the explicit subgroup using the availability values for each mobile device in the explicit subgroup and the actual distance between each mobile device in the explicit subgroup and the first mobile device, wherein the relative values are values that respectively rate response times for each of the mobile devices to the first mobile device; and transmitting, by the processor, the relative values to the first mobile device for display.

23. The method of claim 22, wherein determining, by the processor, the availability value for each of the mobile devices in the explicit subgroup comprises, for each mobile device in the explicit subgroup:

determining whether the refined fixed location of the mobile device in the explicit subgroup is stored in a historic location-availability database and associated with the mobile device in the explicit subgroup;

when the refined fixed location of the mobile device in the explicit subgroup is stored in the historic location-availability database, obtaining an assessment of availability associated with the refined fixed location of the mobile device in the explicit subgroup and the identification of mobile device in the explicit subgroup, wherein the assessment of availability may be stored in the historic location-availability database in association with the mobile device in the explicit subgroup; and generating the availability value based on the assessment of availability obtained.

* * * * *